United States Patent
Fujii et al.

(10) Patent No.: US 9,446,606 B2
(45) Date of Patent: Sep. 20, 2016

(54) AQUEOUS INK FOR INKJET, INKJET RECORDER AND INKJET RECORDING METHOD

(71) Applicants: Ichiroh Fujii, Kanagawa (JP); Naohiro Toda, Kanagawa (JP); Tomohiro Nakagawa, Kanagawa (JP); Hidefumi Nagashima, Kanagawa (JP); Juichi Furukawa, Kanagawa (JP)

(72) Inventors: Ichiroh Fujii, Kanagawa (JP); Naohiro Toda, Kanagawa (JP); Tomohiro Nakagawa, Kanagawa (JP); Hidefumi Nagashima, Kanagawa (JP); Juichi Furukawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 29 days.

(21) Appl. No.: 14/505,576

(22) Filed: Oct. 3, 2014

(65) Prior Publication Data
US 2015/0116433 A1   Apr. 30, 2015

(30) Foreign Application Priority Data
Oct. 24, 2013 (JP) ................. 2013-221300

(51) Int. Cl.
*B41J 11/00* (2006.01)
*C09D 175/06* (2006.01)
*C09D 11/10* (2014.01)
(Continued)

(52) U.S. Cl.
CPC .............. *B41J 11/002* (2013.01); *C08L 75/00* (2013.01); *C09D 11/10* (2013.01); *C09D 11/102* (2013.01); *C09D 11/322* (2013.01); *C09D 175/06* (2013.01)

(58) Field of Classification Search
CPC ........ B41J 2/01; B41J 2/0057; B41J 2/1433; B41J 2/17; B41J 2/1755; B41J 2/17593; B41J 2/21; B41J 2/211; B41J 2/2107; B41J 2/2114; B41J 2/2117; B41J 2/2056; B41J 11/0015; B41J 11/002; B41J 3/60; B41M 5/0011; B41M 5/0017; B41M 5/52; B41M 5/5218; B41M 7/00; B41M 7/0072; B41M 7/0081; B41M 7/009; C09D 11/005; C09D 11/30; C09D 11/32; C09D 11/322; C09D 11/328; C09D 11/36; C09D 11/38; C09D 11/40; C09D 11/52; C09D 11/54; C09D 11/101; C09D 175/06; C08L 75/00
USPC ................ 347/9–22, 88, 95–105; 106/31.13, 106/31.27, 31.6, 31.85, 31.77; 523/160, 523/161, 106
See application file for complete search history.

(56) References Cited

U.S. PATENT DOCUMENTS

2012/0176455 A1* 7/2012 Ohta ................... B41M 5/0011
347/102

(Continued)

FOREIGN PATENT DOCUMENTS

JP   2005-220352   8/2005
JP   2011-094082   5/2011

OTHER PUBLICATIONS

U.S. Appl. No. 14/320,859, filed Jul. 1, 2014.
(Continued)

*Primary Examiner* — Matthew Luu
*Assistant Examiner* — Rut Patel
(74) *Attorney, Agent, or Firm* — Cooper & Dunham LLP (57) ABSTRACT

An aqueous ink for inkjet includes water; a hydrosoluble organic solvent; a pigment; and a particulate resin. The hydrosoluble organic solvent includes 2,3-butanediol and 1,2-propanediol at a weight ratio (2,3-butanediol/1,2-propanediol) of from 98/2 to 60/40.

8 Claims, 3 Drawing Sheets

(51) Int. Cl.
  *C09D 11/102* (2014.01)
  *C09D 11/322* (2014.01)
  *C08L 75/00* (2006.01)

(56) References Cited

U.S. PATENT DOCUMENTS

| | | |
|---|---|---|
| 2012/0293582 A1 | 11/2012 | Goto et al. |
| 2012/0308785 A1 | 12/2012 | Nakagawa |
| 2012/0320133 A1 | 12/2012 | Namba et al. |
| 2012/0328853 A1 | 12/2012 | Matsuyama et al. |
| 2013/0002776 A1 | 1/2013 | Nagashima et al. |
| 2013/0023614 A1 | 1/2013 | Hatada et al. |
| 2013/0113860 A1 | 5/2013 | Gotou et al. |
| 2013/0194345 A1 | 8/2013 | Tamai et al. |
| 2013/0197144 A1 | 8/2013 | Katoh et al. |
| 2013/0271524 A1 | 10/2013 | Katoh et al. |
| 2014/0002539 A1 | 1/2014 | Goto et al. |
| 2014/0192112 A1 | 7/2014 | Nagashima et al. |
| 2014/0192121 A1 | 7/2014 | Bannai et al. |
| 2014/0267520 A1 | 9/2014 | Toda et al. |

OTHER PUBLICATIONS

U.S. Appl. No. 14/297,868, filed Jun. 6, 2014.

\* cited by examiner

AQUEOUS INK FOR INKJET, INKJET RECORDER AND INKJET RECORDING METHOD

CROSS-REFERENCE TO RELATED APPLICATIONS

This patent application is based on and claims priority pursuant to 35 U.S.C. §119 to Japanese Patent Application No. 2013-221300, filed on Oct. 24, 2013, in the Japan Patent Office, the entire disclosure of which is hereby incorporated by reference herein.

BACKGROUND

1. Technical Field

The present invention relates to an aqueous ink for inkjet used in inkjet recording methods, and an inkjet recorder and an inkjet recoding method using the ink.

2. Description of the Related Art

Inkjet printers have been widely used as digital signal output equipment in general homes because of having advantages such as low noise, low running cost, and easiness of color printing. In recent years, inkjet techniques have been increasingly utilized not only in such homes but also for industrial applications such as a display, a poster, and a bulletin board.

As such inks, for example, solvent-based inkjet inks using an organic solvent as a vehicle, and ultraviolet curable inkjet inks including a polymerizable monomer as a main component have been ever used widely.

However, the solvent-based inkjet inks are not preferable in terms of environmental load because the solvent is evaporated in the atmosphere, and the ultraviolet curable inkjet inks have limited application fields because they may have skin sensitizing properties depending on the monomer to be used and an expensive ultraviolet irradiation apparatus is required to be incorporated to the main body of a printer.

In view of such background, there have been recently developed inkjet inks capable of being used in the industrial applications, which are aqueous inks for inkjet recording which give less environmental load and which have been widely used as inkjet inks for household use.

Examples of such known arts are disclosed in Japanese published unexamined applications Nos. JP-2005-220352-A and JP-2001-094082-A.

However, such aqueous inks generally have several drawbacks pointed out in terms of reliability, as compared with the solvent-based inkjet inks. Namely, when the ink dries at a nozzle surface, resin particles in the ink begins to melt and the ink increases in viscosity at the surface, resulting in difficulty of ink discharge.

In order to solve this problem, a solvent having high moisture retainability such as glycerin is thought to be added. However, nonpermeable substrates an ink does not substantially permeate are used in many cases in the industrial applications. Such a solvent having high boiling point causes the resultant ink to poorly dry, and it is easily conceivable blocking occurs, i.e., the ink transfers to the back of prints when overlapped or rolled.

Further, the ink has a problem not only before discharged but also after discharged. Namely, the ink on the nonpermeable substrates needs to have high toughness because of being supposed to be exposed outdoors.

SUMMARY

Accordingly, one object of the present invention is to provide an aqueous ink for inkjet having good dischargeability without repelling when printed on nonpermeable substrates, high glossiness with good wettability and high smoothness, and good abrasion resistance.

Another object of the present invention is to provide an inkjet recorder using the ink.

A further object of the present invention is to provide an inkjet recording method using the ink.

These objects and other objects of the present invention, either individually or collectively, have been satisfied by the discovery of an aqueous ink for inkjet, including water; a hydrosoluble organic solvent; a pigment; and a particulate resin, wherein the hydrosoluble organic solvent comprises 2,3-butanediol and 1,2-propanediol at a weight ratio (2,3-butanediol/1,2-propanediol) of from 98/2 to 60/40.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

The present invention provides an aqueous ink for inkjet having good dischargeability without repelling when printed on nonpermeable substrates, high glossiness with good wettability and high smoothness, and good abrasion resistance.

Hereinafter, the present invention is explained in detail.

The aqueous ink for inkjet (hereinafter referred to "ink" as well) includes at least water, a hydrosoluble organic solvent, a pigment and a particulate resin as its structural components, and may include other various additives when necessary.

Hereinafter, the structural components are explained in order.

<Hydrosoluble Organic Solvent>

Since the hydrosoluble organic solvent used in the aqueous ink typically has a boiling point higher than that of water, it needs to have comparatively a low boiling point for the ink to have quick dryability.

However, the particulate resin typically forms a film too quickly to have uniformity, strength and glossiness when quick dryability is required.

The present invention uses 2,3-butanediol as the hydrosoluble organic solvent to solve this problem. The 2,3-butanediol has a low boiling point, capable of enhancing dryability of the ink on a substrate. Further, a combination of the 2,3-butanediol and 1,2-propanediol at a weight ratio (2,3-butanediol/1,2-propanediol) of front 98/2 to 60/40 prevents the ink from repelling when printed on a nonpermeable substrate. In addition, the ink produces images having high smoothness and glossiness with good wettability.

The ink preferably includes the 2,3-butanediol in an amount of from 5 to 40% by weight, and more preferably from 10 to 30% by weight.

When the ink further includes at least one of 1,3-propanediol, 1,2-butanediol and 1,3-butanediol as the hydrosoluble organic solvent, it has higher discharge stability. The ink preferably includes the hydrosoluble organic solvent in an amount of from 3 to 35% by weight, and more preferably from 5 to 25% by weight.

In addition to the above diol compounds, other hydrosoluble organic solvents mentioned later may be added to the ink when necessary. The ink preferably includes the hydrosoluble organic solvents in an amount of from 20 to 70% by weight, and more preferably from 30 to 60% by weight in total. When not less than 20% by weight, the ink is difficult to dry and has sufficient discharge stability. When not greater than 70% by weight, the ink does not increase in viscosity too much.

Specific examples of the other hydrosoluble organic solvents include polyols such as ethylene glycol, 1,2-butanediol, 2-methyl-2,4-pentanediol, diethylene glycol, triethylene glycol, dipropylene glycol, 1,4-butanediol, 2,2-dimethyl-1,3-propanediol, 1,2-pentanediol, 2,4-pentanediol, 1,5-pentanediol, 1,6-hexanediol, 2-ethyl-1,3-hexanediol and 2,5-hexanediol; polyol alkyl ethers such as dipropylene glycol monomethylether, propylene glycol-n-butyl ether, propylene glycol-t-butyl ether, diethylene glycol methyl ether, ethylene glycol-n-propylether, ethylene glycol-n-butyl ether, dipropylene glycol-n-propylether, tripropylene glycol methyl ether, tripropylene n-propylether, propylene glycol phenyl ether, triethylene glycol methyl ether, triethylene glycol ethyl ether, triethylene glycol-n-hexyl ether and ethylene glycol phenyl ether; esters such as ethyl lactate; nitrogen-containing heterocyclic compounds such as N-methyl-2-pyrrolidone, N-hydroxyethyl-2-pyrrolidone, 2-pyrrolidone, 1,3-dimethyl-2-imidazolidionone and ε-caprolactam; amides such as formamide, N-methylformamide and N,N-dimethylformamide; amines such as monoethanolamine, diethanolamine, triethanolamine, monoethyl amine, diethylamine and triethyl amine; and sulfur-containing compounds such as dimethylsulfoxide, sulfolane, thiodiethanol and thiodiglycol.

These can be used alone or n combination,

<Particulate Resin>

The particulate resin is for fixability and stability of the ink, smoothness of the ink layer, and improvement of the image glossiness. The particulate resin is typically added in the form of a resin emulsion including an aqueous medium and a particulate resin dispersed therein.

Specific examples of the particulate resin include, but are not limited to, urethane resins, polyester resins, acrylic resins, vinylacetate resins, styrene resins, butadiene resins, styrene-butadiene resins, vinylchloride resins, acrylic styrene resins and acrylic silicone resins. Particularly, the acrylic resins and the urethane resins are preferably used because the resultant ink has good fixability and stability.

The particulate resin may be a synthesized or marketed resin. Specific examples of the marketed resin include, but are not limited to, Microgel E-1002 and E-5002 (styrene-acrylic particulate resin from Nippon Paint Co., Ltd.), Boncoat 4001 (acrylic particulate resin from DIC Corp.). Boncoat 5454 (styrene-acrylic particulate resin from DIC Corp.), SAE-1014 (styrene-acrylic particulate resin from Zeon Corp.), Saivinol SK-200 (acrylic particulate resin from Saiden Chemical Industry Co., Ltd.), Primal AC-22 and AC-61 (acrylic particulate resin from Rohm and Haas), NANOCRYL SBCX-2821 and 3689 (Acrylic silicone particulate resin from Toyo Ink Mfg. Co., Ltd.), and #3070 (methyl methacrylate polymer particulate resin from Mikuni Color Ltd.)

The particulate resin may include a dispersant such as surfactants when necessary. The dispersant is preferably a self-emulsifying emulsion because the resultant ink has better film performance. The dispersant preferably includes an anionic group so as to have an acid value of from 5 to 100 mg KOH/g in terms of hydrodispersibility, and more preferably from 5 to 50 mg KOH/g such that the resultant ink has good abrasion resistance and chemical resistance.

When a carboxyl group or a sulfonic acid group is used as the anionic group, the resultant dispersant has good hydrodispersibility. Monomers having the anionic groups are used to introduce them in a resin.

The particulate resin preferably has a volume-average particle diameter of from 10 to 1,000 nm, more preferably from 10 to 200 nm, and furthermore preferably from 10 to 50 nm. The particulate resin having a volume-average particle diameter of from 10 to 50 nm increases contact parts between 2,3-butanediol and the surface of the particulate resin and increases film formability thereof. A tough continuous resin film is formed and a printed matter having high strength is obtained. The volume-average particle diameter is measured by a particle diameter analyzer Microtrac UPA9340 from NIKKISO CO., LTD.

The ink preferably includes the particulate resin in an amount of from 1 to 10% by weight in terms of its fixability and stability, and more preferably from 5 to 10% by weight to improve smoothness of the ink layer, glossiness of the resultant images and fixability on a substrate.

The ink preferably included the particulate resin more than a pigment because of being capable of producing images having higher glossiness and abrasion resistance.

<Pigment>

As the pigment, any of an inorganic pigment and an organic pigment can be used.

As the inorganic pigment, for example, in addition to titanium oxide, iron oxide, calcium carbonate, barium sulfate, aluminum hydroxide, Barium Yellow, Cadmium Red, and Chrome Yellow, carbon black produced by a known method such as a contact method, a furnace method, and a thermal method can be used.

Examples of the organic pigment include azo pigments (including azo lakes, insoluble azo pigments, condensed azo pigments, and chelate azo pigments), polycyclic pigments (for example, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (for example, basic dye-type chelates and acidic dye-type chelates), nitro pigments, nitroso pigments, and aniline black.

The pigment preferably has affinity with a solvent.

Specific examples of the pigment for black ink include carbon black (C.I. Pigment Black 7) such as furnace black, lamp black, acetylene black, and channel black; metals such as copper, iron (C.I. Pigment Black 11), metal oxides such as titanium oxide; and organic pigments such as aniline black (C.I. Pigment Black 1).

Specific examples of the pigment for color ink include C.I. Pigment Yellow 1, 3, 12, 13, 14, 17, 24, 34, 35, 37, 42 (Yellow Iron Oxide), 53, 55, 74, 81, 83, 95, 97, 98, 100, 101, 104, 108, 109, 110, 117, 120, 128, 139, 150, 151, 155, 153, 180, 183, 185 and 213, C.I. Pigment Orange 5, 13, 16, 17, 36, 43 and 51, C.I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (Rouge), 104, 105, 106, 108 (Cadmium Red), 112, 114, 122 (Quinacridone Magenta), 123, 146, 149, 166, 168, 170, 172, 177, 178, 179, 185, 190, 193, 209 and 219, C.I. Pigment Violet 1 (Rhodamine Lake), 3, 5:1, 16, 19, 23 and 38. C.I. Pigment Blue 1, 2, 15 (Phthalocyanine Blue), 15:1, 15:2, 15:3 (Phthalocyanine Blue), 16, 17:1, 56, 60 and 63; and C.I. Pigment Green 1, 4, 7, 8, 10, 17, 18 and 36.

The ink preferably includes the pigment in an amount of from 0.1 to 10%, and more preferably from 1 to 10% by weight. Increase of the pigment concentration typically increases the image density and improves the image quality, but increases the viscosity of the ink as well, resulting in discharge difficulty thereof or clogging.

Methods of dispersing the pigment in an ink include, but are not limited to, a method of using a dispersant such as a surfactant or a dispersible resin, a method of coating the surface of the pigment with a resin, and a method of introducing a hydrophilic functional group to the surface of a pigment to form a self-dispersible pigment.

Known dispersants such as polymer dispersants and hydrosoluble surfactants can be used.

The pigment preferably has a surface area of 10 $m^2/g$ to 1,500 $m^2/g$, more preferably 20 $m^2/g$ to 600 $m^7/g$, further preferably 50 $m^2/g$ to 300 $m^2/g$.

When the desired surface area is not achieved, the pigment may be subjected to a size reduction or grinding treatment (for example, ball mill grinding or jet mill grinding, or an ultrasonic treatment) so as to have a relatively small particle size.

The volume average particle size) of the pigment in the ink is preferably 10 nm to 200 nm and more preferably 20 nm to 150 nm. If the volume average particle size exceeds 200 nm, not only pigment-dispersing stability as the ink composition is deteriorated, but also discharge stability is deteriorated and image quality such as image density is also lowered, and thus such a volume average particle size is not preferable. If the volume average particle size is less than 10 nm, storage stability of the ink composition and jetting properties thereof in a printer are stabilized, but the pigment dispersed to such a small particle size makes a dispersing operation and a classifying operation complicated, making it difficult to economically produce a recording liquid.

Specific examples of the other various additives added when necessary include a surfactant, an antiseptic/antifungal agent, an anticorrosive agent, and a pH adjuster.
<Surfactant>

In the ink of the present invention, a surfactant may be added in order to ensure wettability to a medium. The surfactant that can be used is not particularly limited as long as it satisfies the above limitation.

The ink preferably includes of the surfactant in an amount of from 0.1 to 5% by weight. When below 0.1% by weight, wettability on the non-porous substrate is not sufficient to cause the degradation in image quality, and when greater than 5% by weight, the ink easily foams to cause non-discharge.

While any of an amphoteric surfactant, a non-ionic surfactant, and an anionic surfactant can be used, non-ionic surfactants such as polyoxyethylene alkyl phenyl ether, polyoxyethylene alkyl ester, polyoxyethylene alkylamine, polyoxyethylene alkylamide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability of the color material and image quality. In addition, a fluorine-based surfactant and a silicone-based surfactant can be used in combination (or singly) depending on formulation.
<Antiseptic/Antifungal Agent>

Specific examples of the antiseptic/antifungal agent include, but are not limited to, 1,2-benzisothiazolin-3-one, sodium benzoate, sodium dehydroacetate, sodium sorbate, sodium pentachlorophenol, and sodium 2-pyridinethiol-1-oxide.
<Anticorrosive Agent>

Specific examples of the anticorrosive agent include acidic sulfite, sodium thiosulfate, ammonium thiodiglycolate, diisopropylammonium nitrite, pentaerythritol tetranitrate, and dicyclohexylammonium nitrite.
<pH Adjuster>

As the pH adjuster, any substance can be used as long as it can adjust the pH to the desired value without having any adverse effect on the ink formulated. Examples thereof include hydroxides of alkali metal elements, such as lithium hydroxide, sodium hydroxide and potassium hydroxide, carbonates of alkali metals, such as lithium carbonate, sodium carbonate and potassium carbonate, quaternary ammonium hydroxide, amines such as diethanolamine and triethanolamine, ammonium hydroxide, and quaternary phosphonium hydroxide.

The ink of the present invention is produced by dispersing or dissolving the components in an aqueous medium, and further stirring and mixing the resultant, if necessary. The stirring and mixing can be performed by a stirrer using a usual stirring blade, a magnetic stirrer, a high-speed disperser, or the like, but the present invention does not depend on the production method.

The ink of the present invention applied to a nonpermeable substrate forms an image having particularly good glossiness and toughness.

The nonpermeable substrate is formed of plastic materials such as transparent or colored polyvinylchloride (PVC) films, polyethyleneterephthalate (PET) films, polycarbonate films, acrylic films, polypropylene films, polyimide films and polystyrene films without including paper components such as wood pulp papers, Japanese papers, synthetic pulp papers and synthetic fiber papers. Particularly, the ink is preferably used on plastic films such as the polyvinylchloride (PVC) films, the polyethyleneterephthalate (PET) films and the polycarbonate films. The ink is effectively used on other nonpermeable substrates, plain papers and conventional porous media such as inorganic coated porous media as well.
<Inkjet Recorder and Inkjet Recording Method>

The inkjet recorder of the present invention includes at least an ink flyer applying an energy to an ink to fly to record an image, a conveyor conveying a substrate and a heater heating the (nonpermeable) substrate to fix the ink thereon.

The inkjet recording method of the present invention includes at least an ink flying process of applying an energy to an ink to fly to record an image, a conveying process of conveying a substrate and a heating process of heating the (nonpermeable) substrate to fix the ink thereon.

The ink flyer is a unit for applying a stimulus to the ink constituting the present invention to thereby allow the ink to be ejected, forming an image. The ink flyer is not particularly limited, and can be appropriately selected depending on the object. Examples thereof include various recording heads (ink discharge heads), and in particular, one having a head having a plurality of nozzle rows and a sub-tank for accommodating a liquid supplied from a tank for liquid storage to supply the liquid to the head is preferable.

The sub-tank preferably includes a negative pressure generator generating a negative pressure therein, an atmosphere releaser releasing an atmosphere therein and a detector detecting presence of the ink with a difference of electrical resistance.

The ink flying process is performed by the ink flyer.

The stimulus can be generated by a stimulus-generator, the stimulus is not particularly limited and can be appropriately selected depending on the object, and examples thereof include heat (temperature), pressure, vibration, and, light. These may be used singly or in combinations of two or more. Among them, heat and pressure are suitable.

Herein, examples of the stimulus-generator include a heating apparatus, a pressurizing apparatus, a piezoelectric element, a vibration-generating apparatus, an ultrasonic wave oscillator, and a light. Specific examples thereof include piezoelectric actuators such as a piezoelectric element, a thermal actuator utilizing a phase transition of liquid due to film boiling using an electrothermal conversion element such as a heat resistor, a shape memory alloy actuator using a metal phase transition due to change in temperature, and a static actuator using an electrostatic force.

The mode of flying the ink is not particularly limited and is different depending on the type of the stimulus, and when the stimulus is "heat", examples of the mode include a method in which heat energy corresponding to a recording signal is applied to the ink in a recording head using a thermal head or the like to thereby allow the ink to generate air bubbles, and the pressure of the air bubbles allows the ink to be discharged and jetted as droplets from a nozzle hole of the recording head.

In addition, when the stimulus is "pressure", examples of the mode include a method in which a voltage is applied to a piezoelectric element bonded to a position called pressure chamber located in an ink passage in a recording head, to deflect the piezoelectric element and to decrease the volume of the pressure chamber, discharging and jetting the ink as droplets from a nozzle hole of the recording head.

The method of applying a voltage to a piezo element is effectively used to fly an ink including a resin because of generating no heat. Particularly, the method effectively prevents an ink including a wetter less from clogging a nozzle.

Further, it is preferable to apply a voltage to the piezo element so as not to discharge an ink and perform blank scan in order to prevent nozzle from falling out.

Further, it is preferable to discharge an ink in an ink reservoir before the blank scan reaches one page printing.

A scraper scraping an ink anchored on a black discharge receiver is preferably included. The scraper is preferably a wiper or a cutter.

Known conveyors such as a transfer roller or a transfer belt can be used as the conveyors conveying a substrate. The conveying process is performed by the conveyor conveying the substrate.

One or plural known heaters can be used as the heater heating the (nonpermeable) substrate to fix the ink thereon. Specific examples of the heaters include forced-air heaters, radiation heaters, conduction heaters and microwave driers. These can be sued alone or in combination.

The heater may he installed in the inkjet printers or attached thereto.

The heating process heating the (nonpermeable) substrate to fix the ink thereon is performed by the conveyor conveying the substrate.

The inkjet recording method of the present invention uses the ink of the present invention and includes a heating process after printing to produce images having good dryability and high glossiness even on a nonpermeable substrate. Further, the image is preferably heated at from 40 to 80° C. after printed. With this temperature, the substrate is not deformed with heat and the image gas good fixability and better glossiness.

Figure 1:
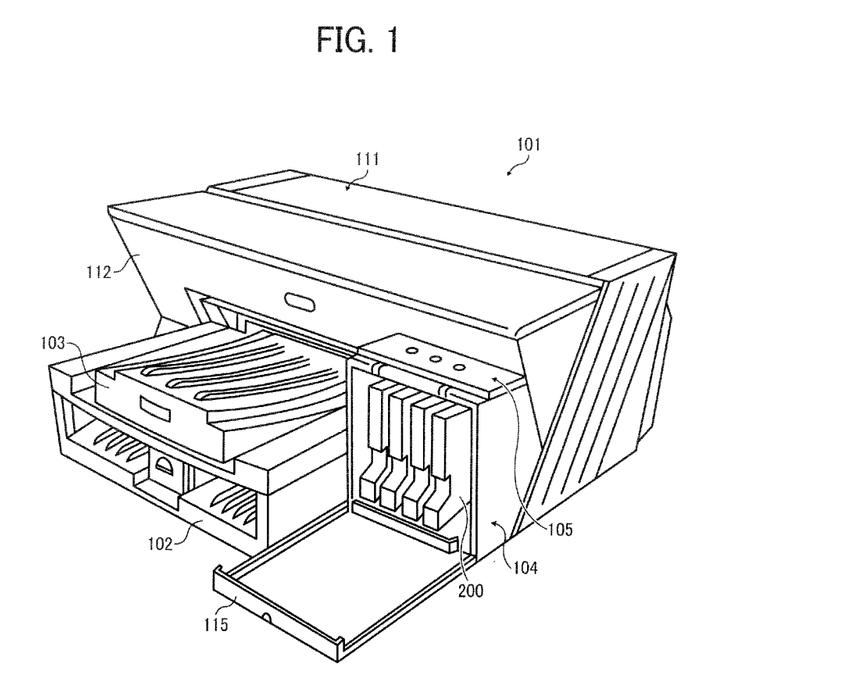
FIG. 1 is a schematic view illustrating an embodiment of the inkjet recorder of the present invention.
Figure 2:
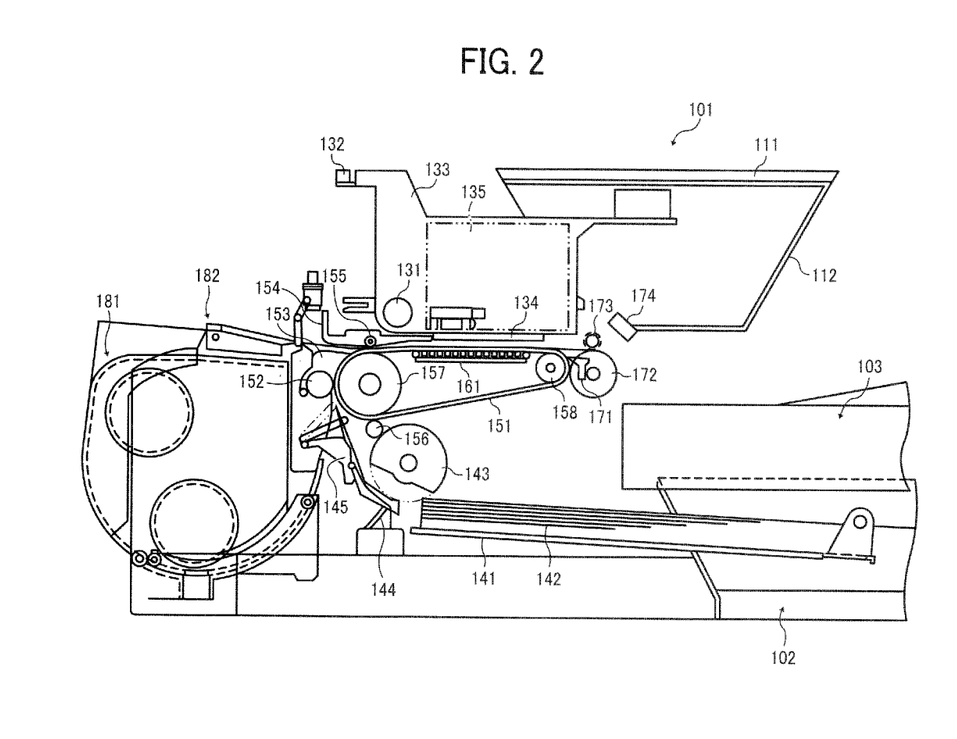
FIG. 2 is a schematic view illustrating the internal configuration of the inkjet recorder in FIG. 1.

The inkjet recorder of the present invention is explained, referring to FIGS. 1 and 2. FIG. 1 is a schematic view illustrating an embodiment of the inkjet recorder of the present invention, and FIG. 2 is a schematic view illustrating the internal configuration of the inkjet recorder in FIG. 1.

The inkjet recorder illustrated in FIG. 1 includes a main body 101 thereof, a recording sheet feed tray 102, which is attached to the main body 101 and on which a stack of nonpermeable substrates is set, a copy tray 103, which is attached to the main body 101 and on which the substrates bearing ink images thereon are stacked, and an ink cartridge setting portion 104 to which ink cartridges 200 are detachably attached. On the upper surface of the ink cartridge setting portion 104, an operating portion 105 including operation keys, a display, etc. is arranged. The ink cartridge setting portion 104 has a front cover 115 which is openable and closable so that the ink cartridges 200 can be attached to the ink cartridge setting portion 104 or detached therefrom. Numerals 111 and 112 respectively denote an upper cover of the inkjet recorder, and a front cover of the apparatus.

As illustrated in FIG. 2, a carriage 133 is slidably supported by a guide rod 131 and a stay 132, which are supported by both side plates (not shown) of the main body 101, so that the carriage 133 is moved in a main scanning direction by a main scanning motor (not shown) to perform a scanning operation (i.e., an image forming operation).

An inkjet recording head 134 including four inkjet recording heads, each of which has multiple nozzles arranged in a direction perpendicular to the main scanning direction (A) to eject droplets of yellow (Y), magenta (M), cyan (C) or black (K) inkjet ink downward, is provided on the carriage 133.

Each of the four inkjet recording heads 134 includes an energy generator to eject ink droplets. Specific examples of the energy generator include, but are not limited thereto, piezoelectric actuators (e.g., piezoelectric devices), thermal actuators to eject ink droplets utilizing phase change of ink by boiling a liquid film using an electrothermal device such as a resistor, shape memory alloy actuators utilizing phase change of metal caused by temperature change, and electrostatic actuators utilizing electrostatic force.

In addition, sub-tanks 135 containing the color inkjet inks to supply the color inkjet inks to the respective recording heads 134 are provided on the carriage 133. The color inkjet inks in the ink cartridges 200 set to the ink cartridge setting portion 104 are supplied to the respective sub-tanks 135 via respective ink supplying tubes (not shown).

The inkjet recorder includes a recording sheet supplier to feed substrates 142 set on a sheet loading portion (pressing plate) 141. The recording sheet supplier includes a sheet feeding roller 143 to feed the substrates 142, and a separation pad 144, which faces the sheet feeding roller 143 while being biased toward the sheet feeding roller 143 and which is made of a material having a high friction coefficient, to feed the substrates 142 one by one from the sheet loading portion 141.

The inkjet recorder further includes a feeder to feed the substrate 142, which is fed from the recording sheet supplier, toward the image recording area located below the inkjet recording head 134. The feeder includes a feeding belt 151 to feed the substrate 142 while electrostatically attracting the recording sheet, a counter roller 152 to feed the substrate 142, which is fed from the recording sheet supplier along a guide 145, while sandwiching the substrate 142 with the feeding belt 151, a direction changing guide 153 to change the direction of the substrate 142, which is fed substantially vertically, at an angle of about 90° so that the substrate 142 is contacted with the feeding belt 151 so as to be fed thereby, a pressing roller 155 which is biased toward the feeding belt 151 by a pressing member 154, and a charging roller 156 to charge the surface of the feeding belt 151.

The feeding belt 151 is an endless belt, which is tightly stretched by a feeding roller 157 and a tension roller 158 so as to be rotated in a recording sheet feeding direction (i.e., a sub-scanning direction (B)) perpendicular to the main scanning direction (A). For example, the feeding belt 151 includes a first layer (i.e., an uppermost layer), which electrostatically attracts the substrate 142 and which is made of a resin layer (such as a tetrafluoroethylene-ethylene copolymer (ETFE) whose electric resistance is not controlled) with a thickness of about 40 μm, and a second layer (i.e., a medium resistance layer or a grounding layer), which is made of almost the same material as that of the first layer except that carbon black is included therein so that the second layer has a medium electric resistance. In addition, a guide member 161 is arranged below the feeding belt 151 so as to face the image recording area in which an image is recorded on the substrate 142 by the inkjet recording head 134. The inkjet recorder further includes a sheet discharger to discharge the substrate 142, which bears an image recorded by the inkjet recording head 134, from the main body 101. The sheet discharger includes a separation pick 171 to separate the substrate 142 from the feeding belt 151, and discharging rollers 172 and 173 to discharge the substrate 142 toward the copy tray 103 located below the discharging roller 172.

A duplex copy unit 181 is detachably attached to the backside of the main body 101 of the inkjet recorder. The duplex copy unit 181 receives the substrate 142, which is fed to the duplex copy unit 181 by reversely rotating the feeding belt 151, and feeds again the substrate 142 to the nip between the counter roller 152 and the feeding belt 151 so that another image is formed on the backside of the substrate 142 by the inkjet recording heads 134 in the image recording area. A manual sheet feeder 182, by which a recording sheet can be manually fed to the inkjet recorder, is provided above the duplex copy unit 181.

The substrate 142 is supplied one by one by the recording material supplier. The substrate 142 thus fed in substantially the vertical direction is guided by the guide 145 to the nip between the feeding belt 151 and the counter roller 152 so as to be fed by the feeding belt 151 and the counter roller 152. Further, the substrate 142 is guided by the direction changing guide 153 so that the direction of the sheet is changed at an angle of about 90°. The substrate 142 is then fed by the feeding belt 151 while pressed toward the feeding belt 151 by the pressing roller 155.

In this regard, since the feeding belt 151 is charged by the charging roller 156, the substrate 142 is fed by the feeding belt 151 while electrostatically adhered thereto.

Next, the carriage 133 is moved in the main scanning direction while the inkjet recording head 134 is driven according to image signals so as to eject droplets of the color inkjet inks to form one line image on the surface of the substrate 142, which is stopped in the image forming operation. After recording one line image, the substrate 142 is fed in a predetermined length in the sub-scanning direction, and the next image forming operation is performed to form another one line image on the surface of the recording material sheet 142. By repeating the image forming operation, an image is formed on the surface of the recording material sheet 142. When the inkjet recorder receives a signal such that the image recording operation is completed or the rear edge of the substrate 142 reaches the image recording area, the inkjet recorder stops the image forming operation, and the sheet discharger discharges the substrate 142 bearing the image thereon to the copy tray 103.

Figure 3:
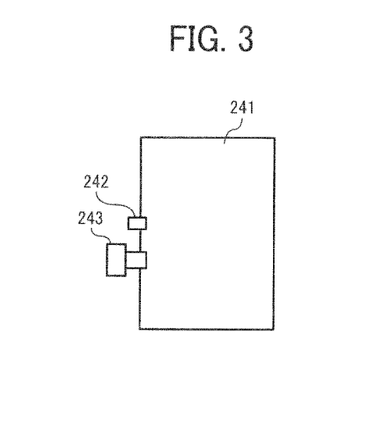
FIG. 3 is an explanatory view illustrating an embodiment of the ink cartridge of the present invention.

The ink cartridge 200 contains a container containing the ink of the present invention therein, and further contains other appropriated selected members as required.

The container is not particularly limited and its shape, structure, size, and material are appropriately selected according to the purpose. Preferred embodiments include those at least having an ink pouch formed by aluminum laminated film or resin film.

Figure 4:
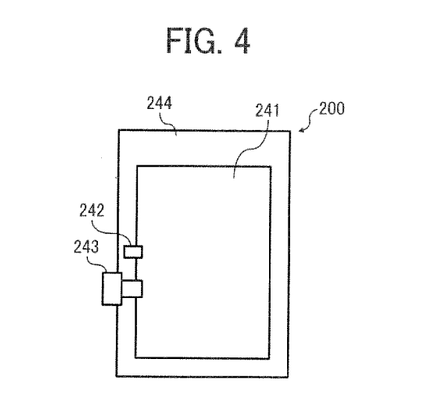
FIG. 4 is an explanatory view illustrating the ink cartridge in FIG. 3 including an outer case.

The ink cartridge 200 is hereinafter described with reference to FIGS. 3 and 4. FIG. 3 is an illustration showing an embodiment of the ink cartridge of the present invention. FIG. 4 is an illustration of the ink cartridge of FIG. 3 including a casing (exterior).

In the ink cartridge 200, as shown in FIG. 3, an ink pouch 241 is filled through an ink inlet 242. The ink inlet 242 is closed by fusion bonding after the air is exhausted. An ink outlet 243 made of a rubber material is pierced by a needle on the apparatus body for use, thereby the ink is supplied to the apparatus. The ink pouch 241 is formed by a packaging member such as a nonpermeable aluminum laminated film. The ink pouch 241 is housed in a cartridge case 244 generally made of plastics as shown in FIG. 4 and detachably mounted on various types of inkjet recorder.

It is particularly preferable that the ink cartridge of the present invention is detachably mounted on the inkjet recorder of the present invention.

A serial type (shuttle type) in which the carriage scans is used in this description but this description is true in a line-type inkjet recorder having a line type head.

The nonpermeable substrates are preferably used in the inkjet recorder of the present invention.

The inkjet recorder of the present invention can be used for various inkjet recordings, and preferably used for inkjet recording printers, facsimiles, copiers, printer/fax/copier complex machines.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Example 1

The following formulation mixture was pre-mixed, and then circulated and dispersed by a disc-type bead mill (Shinmaru Enterprises Corporation, KDL-type, medium: zirconia ball having a diameter of 0.3 mm was used) for 7 hours to prepare a black pigment dispersion.

| Carbon black pigment | 15 |
|---|---|
| Anionic surfactant | 2 |
| (Pionin A-51-B produced by Takemoto Oil & Fat Co., Ltd.) | |
| Ion-exchanged water | 83 |

The black pigment dispersion as used, and mixed and stirred in the following formulation, and thereafter the resultant was subjected to filtration by a 0.2 μm polypropylene filter to prepare an ink.

| Black pigment dispersion | 20 |
|---|---|
| Aqueous particulate polyurethane resin dispersion | 24 |
| (solid content 25%, solvent: water) | |
| HYDRAN HW-340 having a volume-average | |
| particle diameter of 35 nm from DIC Corp. | |
| Surfactant $CH_3(CH_2)_{12}O(CH_2CH_2O)_3CH_2COOH$ | 2 |
| 2,3-butanediol | 20 |
| 1,2-propanediol | 10 |
| 1,3-propanediol | 10 |
| Water | 14 |

Example 2

The procedure for preparation of the black pigment dispersion in Example 1 was repeated except for replacing the carbon black pigment with C.I. Pigment Blue 15:3 to prepare a cyan pigment dispersion.

The cyan pigment dispersion was used, and mixed and stirred in the following formulation, and thereafter the resultant was subjected to filtration by a 0.2 μm polypropylene filter to prepare an ink.

| Cyan pigment dispersion | 20 |
|---|---|
| Aqueous particulate polyurethane resin dispersion | 24 |
| (solid content 25%, solvent: water) | |
| HYDRAN HW-340 having a volume-average | |
| particle diameter of 35 nm from DIC Corp. | |
| Surfactant $CH_3(CH_2)_{12}O(CH_2CH_2O)_3CH_2COOH$ | 2 |
| 2,3-butanediol | 24 |
| 1,2-propanediol | 16 |
| 1,3-propanediol | 5 |
| Water | 9 |

Example 3

The procedure for preparation of the ink in Example 2 was repeated except for changing the ink formulation as follows.

| Cyan pigment dispersion | 20 |
|---|---|
| Aqueous particulate polyurethane resin dispersion | 24 |
| (solid content 25%, solvent: water) | |
| HYDRAN HW-340 having a volume-average | |
| particle diameter of 35 nm from DIC Corp. | |
| Surfactant $CH_3(CH_2)_{12}O(CH_2CH_2O)_3CH_2COOH$ | 2 |
| 2,3-butanediol | 24 |
| 1,2-propanediol | 0.5 |
| 1,3-propanediol | 15 |
| Water | 14.5 |

Example 4

The procedure for preparation of the black pigment dispersion in Example 1 was repeated except for replacing the carbon black pigment with C.I. Pigment Red 122 to prepare a magenta pigment dispersion.

The magenta pigment dispersion was used, and mixed and stirred in the following formulation, and thereafter the resultant was subjected to filtration by a 0.2 μm polypropylene filter to prepare an ink.

| Magenta pigment dispersion | 16 |
|---|---|
| Aqueous particulate polyurethane resin dispersion | 14 |
| (solid content 25%, solvent: water) | |
| HYDRAN HW-340 having a volume-average particle diameter of | |
| 35 nm from DIC Corp. | |
| Surfactant $CH_3(CH_2)_{12}O(CH_2CH_2O)_3CH_2COOH$ | 2 |
| 2,3-butanediol | 40 |
| 1,2-propanediol | 25 |
| 1,3-butanediol | 3 |

Example 5

The procedure for preparation of the black pigment dispersion in Example 1 was repeated except for replacing the carbon black pigment with CT. Pigment Yellow 74 to prepare a yellow pigment dispersion.

The yellow pigment dispersion was used, and mixed and stirred in the following formulation, and thereafter the resultant was subjected to filtration by a 0.2 μm polypropylene filter to prepare an ink.

| Yellow pigment dispersion | 20 |
|---|---|
| Aqueous particulate polyurethane resin dispersion | 24 |
| (solid content 25%, solvent: water) | |
| HYDRAN HW-340 having a volume-average particle diameter of | |
| 35 nm from DIC Corp. | |
| Surfactant $CH_3(CH_2)_{12}O(CH_2CH_2O)_3CH_2COOH$ | 2 |
| 2,3-butanediol | 7 |
| 1,2-propanediol | 0.15 |
| 1,3-butanediol | 13 |
| 1,2-butanediol | 10 |
| Diethyleneglycol-n-butyl ether | 10 |
| Water | 13.85 |

Example 6

The procedure for preparation of the ink in Example 1 was repeated except for changing the ink formulation as follows.

| Black pigment dispersion | 20 |
|---|---|
| Aqueous particulate polyurethane resin dispersion | 15.8 |
| (solid content 38%, solvent: water) | |
| SUPERFLEX 470 having a volume-average particle diameter of | |
| 50 nm from Daiichi Kogyo Seiyaku Co., Ltd. | |
| Surfactant $CH_3(CH_2)_{12}O(CH_2CH_2O)_3CH_2COOH$ | 2 |
| 2,3-butanediol | 20 |
| 1,2-propanediol | 10 |
| 1,3-butanediol | 10 |
| Water | 22.2 |

Example 7

The procedure for preparation of the ink in Example 1 was repeated except for changing the ink formulation as follows.

| Black pigment dispersion | 20 |
|---|---|
| Aqueous particulate polyurethane resin dispersion | 24 |
| (solid content 25%, solvent: water) | |
| HYDRAN HW-340 having a volume-average particle diameter of | |
| 35 nm from DIC Corp. | |

-continued

| | |
|---|---|
| Surfactant $CH_3(CH_2)_{12}O(CH_2CH_2O)_3CH_2COOH$ | 2 |
| 2,3-butanediol | 4 |
| 1,2-propanediol | 2 |
| 1,3-propanediol | 20 |
| 1,2-butanediol | 14 |
| Water | 14 |

Example 8

The procedure for preparation of the ink in Example 4 was repeated except for changing the ink formulation as follows.

| | |
|---|---|
| Magenta pigment dispersion | 16 |
| Aqueous particulate polyurethane resin dispersion (solid content 25%, solvent: water) HYDRAN HW-340 having a volume-average particle diameter of 35 nm from DIC Corp. | 14 |
| Surfactant $CH_3(CH_2)_{12}O(CH_2CH_2O)_3CH_2COOH$ | 2 |
| 2,3-butanediol | 45 |
| 1,2-propanediol | 1 |
| 1,3-butanediol | 5 |
| Water | 17 |

Example 9

The procedure for preparation of the ink in Example 2 was repeated except for changing the ink formulation as follows.

| | |
|---|---|
| Cyan pigment dispersion | 20 |
| Aqueous particulate polyurethane resin dispersion (solid content 25%, solvent: water) HYDRAN HW-340 having a volume-average particle diameter of 35 nm from DIC Corp. | 24 |
| Surfactant $CH_3(CH_2)_{12}O(CH_2CH_2O)_3CH_2COOH$ | 2 |
| 2,3-butanediol | 20 |
| 1,2-propanediol | 10 |
| Diethyleneglycol-n-butyl ether | 10 |
| Water | 14 |

Example 10

The procedure for preparation of the ink in Example 5 was repeated except for changing the ink formulation as follows.

| | |
|---|---|
| Yellow pigment dispersion | 20 |
| Aqueous particulate polyurethane resin dispersion (solid content 38%, solvent: water) SUPERFLEX 470 having a volume-average particle diameter of 50 nm from Daiichi Kogyo Seiyaku Co., Ltd. | 20 |
| Surfactant $CH_3(CH_2)_{12}O(CH_2CH_2O)_3CH_2COOH$ | 2 |
| 2,3-butanediol | 20 |
| 1,2-propanediol | 10 |
| 3-methyl-1,3-butanediol | 10 |
| Water | 18 |

Example 11

The procedure for preparation of the ink in Example 1 was repeated except for changing the ink formulation as follows.

| | |
|---|---|
| Black pigment dispersion | 20 |
| Aqueous particulate polyurethane resin dispersion (solid content 25%, solvent: water) | 12 |

-continued

| | |
|---|---|
| HYDRAN HW-340 having a volume-average particle diameter of 35 nm from DIC Corp. | |
| Surfactant $CH_3(CH_2)_{12}O(CH_2CH_2O)_3CH_2COOH$ | 2 |
| 2,3-butanediol | 20 |
| 1,2-propanediol | 10 |
| 1,3-propanediol | 10 |
| 1,2-butanediol | 10 |
| Water | 16 |

Example 12

The procedure for preparation of the ink in Example 1 was repeated except for changing the ink formulation as follows.

| | |
|---|---|
| Black pigment dispersion | 20 |
| Aqueous particulate polyurethane resin dispersion (solid content 25%, solvent: water) HYDRAN AP-30F having a volume-average particle diameter of 60 nm from DIC Corp. | 24 |
| Surfactant $CH_3(CH_2)_{12}O(CH_2CH_2O)_3CH_2COOH$ | 2 |
| 2,3-butanediol | 20 |
| 1,2-propanediol | 10 |
| 1,3-propanediol | 10 |
| Water | 14 |

Comparative Example 1

The procedure for preparation of the ink in Example 1 was repeated except for changing the ink formulation as follows.

| | |
|---|---|
| Black pigment dispersion | 20 |
| Aqueous particulate polyurethane resin dispersion (solid content 25%, solvent: water) HYDRAN AP-30F having a volume-average particle diameter of 60 nm from DIC Corp. | 24 |
| Surfactant $CH_3(CH_2)_{12}O(CH_2CH_2O)_3CH_2COOH$ | 2 |
| 2,3-butanediol | 20 |
| 1,3-propanediol | 20 |
| Water | 14 |

Comparative Example 2

The procedure for preparation of the ink in Example 1 was repeated except for changing the ink formulation as follows.

| | |
|---|---|
| Black pigment dispersion | 20 |
| Aqueous particulate polyurethane resin dispersion (solid content 25%, solvent: water) HYDRAN AP-30F having a volume-average particle diameter of 60 nm from DIC Corp. | 24 |
| Surfactant $CH_3(CH_2)_{12}O(CH_2CH_2O)_3CH_2COOH$ | 2 |
| 1,2-propanediol | 20 |
| 1,3-propanediol | 20 |
| Water | 14 |

Comparative Example 3

The procedure for preparation of the ink in Example 1 was repeated except for changing the ink formulation as follows.

| Black pigment dispersion | 20 |
| --- | --- |
| Aqueous particulate polyurethane resin dispersion (solid content 25%, solvent: water) HYDRAN AP-30F having a volume-average particle diameter of 60 nm from DIC Corp. | 24 |
| Surfactant $CH_3(CH_2)_{12}O(CH_2CH_2O)_3CH_2COOH$ | 2 |
| 2,3-butanediol | 15 |
| 1,2-propanediol | 15 |
| 1,3-propanediol | 10 |
| Water | 14 |

Comparative Example 4

The procedure for preparation of the ink in Example 1 was repeated except for changing the ink formulation as follows.

| Black pigment dispersion | 20 |
| --- | --- |
| Aqueous particulate polyurethane resin dispersion (solid content 25%, solvent: water) HYDRAN AP-30F having a volume-average particle diameter of 60 nm from DIC Corp. | 24 |
| Surfactant $CH_3(CH_2)_{12}O(CH_2CH_2O)_3CH_2COOH$ | 2 |
| 2,3-butanediol | 30 |
| 1,2-propanediol | 0.5 |
| 1,3-propanediol | 10 |
| Water | 13.5 |

Comparative Example 5

The procedure for preparation of the ink Example 1 was repeated except for changing the ink formulation as follows.

| Black pigment dispersion | 20 |
| --- | --- |
| Surfactant $CH_3(CH_2)_{12}O(CH_2CH_2O)_3CH_2COOH$ | 2 |
| 2,3-butanediol | 20 |
| 1,2-propanediol | 10 |
| 1,3-propanediol | 10 |
| 1,2-butanediol | 10 |
| Water | 28 |

The following properties of each of the inks of Examples 1 to 12 and Comparative Examples 1 to 5 were evaluated. The results are shown in Table 1.

<Discharge Stability>

Each of the inks was loaded to an inkjet printer having a covering unit (IPSIO GXe5500 from Ricoh Company Ltd.) and left to stand at a temperature of 10° C. and at a humidity of 15% RH for 1 week while a head being covered, thereafter a nozzle check pattern was printed, and the presences of non-discharge and jet disturbance were visually observed, and determined according to the following criteria.

A: Neither non-discharge nor jet disturbance is observed at all.
B: Slight jet disturbance is observed.
C: Nozzle in which non-discharge is observed is present.
D: Non-discharge is observed in a plurality of nozzles.

<Repellency>

Each of the inks produced was loaded to an inkjet printer (IPSIO GXe5500 from Ricoh Company Ltd.). Then, a solid image was printed on a PVC film (IJ5331 from Sumitomo 3M Limited), with a part of the PVC film directly below its inkjet head being heated to 60° C. by a sheet heater from the back surface thereof, and immediately thereafter, the repellency was determined according to the following criteria from the state of a solid portion.

A: Printing is uniformly performed on solid portion.
B: Repellency of a diameter of smaller than 1 mm is observed in solid portion.
C: Repellency of a diameter of larger than 1 mm is observed in solid portion.

<Glossiness>

Each of the inks produced was loaded to an inkjet printer having a heating fan after printing (IPSIO GXe5500 from Ricoh Company Ltd.). After a solid image was printed on a nonpermeable PVC film (IJ5331 manufactured Sumitomo 3M Limited), the image was dried by the heating fan at 60° C. Then, the glossiness at 60° of the solid image was measured by a gloss meter (4501 manufactured by BYK Gardener), and evaluated according to the following criteria.

A: Glossiness at 60° is not less than 100%.
B: Glossiness at 60° is not less than 81% and less than 100%.
C: Glossiness at 60° is not less than and less than 80%.
D: Glossiness at 60° is less than 60%.

<Scratch Resistance>

Each of the inks produced was loaded to an inkjet printer having a heating fan after printing (IPSIO GXe5500 from Ricoh Company Ltd.). After a solid image was printed on a nonpermeable PVC film (IJ5331 manufactured Sumitomo 3M Limited), the image was dried by the heating fan at 60° C. The solid portion was scratched by dry cotton (Kanakin #3) under a load of 400 g, and the scratch resistance was determined according to the following criteria.

A: Image is not changed even after being scratched 50 times or more.
B: Some scratch remains at the stage of scratching for 50 times, but has no effect on image density and is not problematic for practical use
C: Image density is reduced during scratching for 21 to 50 times.
D: Image density is reduced during scratching for 20 times or less.

Example 13

The ink in Example 1 was loaded to an inkjet printer having a heating fan after printing (IPSIO GXe5500 from Ricoh Company Ltd.). After a solid image was printed on a nonpermeable PVC film (IJ5331 manufactured Sumitomo 3M Limited), the image was left while the heating fan was off.

The glossiness and the scratch resistance he solid image were evaluated. The results are shown in Table 1.

Examples 14 to 17

The ink in Example 1 was loaded to an inkjet printer having a heating n after printing (IPSIO GXe5500 from Ricoh Company Ltd.). After a solid image was printed on a nonpermeable PVC film (IJ5331 manufactured Sumitomo 3M Limited), the image was dried at the following temperatures.

Example 14: 40° C.
Example 15: 80° C.
Example 16: 30° C.
Example 17: 90° C.

The glossiness and the scratch resistance of the solid image of each Example were evaluated. The results are shown in Table 1.

TABLE 1

| | Discharge Stability | Repellency | Glossiness | Scratch Resistance |
|---|---|---|---|---|
| Example 1 | A | A | A | A |
| Example 2 | A | A | A | A |
| Example 3 | A | A | A | A |
| Example 4 | A | A | A | A |
| Example 5 | A | A | A | A |
| Example 6 | A | A | A | A |
| Example 7 | A | B | B | A |
| Example 8 | B | A | A | A |
| Example 9 | B | A | A | A |
| Example 10 | B | B | A | A |
| Example 11 | A | A | B | B |
| Example 12 | | A | A | A |
| Example 13 | A | A | B | C |
| Example 14 | A | A | A | A |
| Example 15 | A | A | A | A |
| Example 16 | A | A | B | B |
| Example 17 | A | A | B | A |
| Comparative Example 1 | C | C | C | B |
| Comparative Example 2 | B | C | C | B |
| Comparative Example 3 | B | C | C | B |
| Comparative Example 4 | C | B | C | B |
| Comparative Example 5 | A | B | D | D |

Table 1 proves each of the inks in Examples 1 to 12 has good discharge stability, no repellency when printed on a nonpermeable substrate, high glossiness because of good wettability and high smoothness of images, and good scratch resistance. In contrast, the n in Comparative Examples 1 to 5 which do not satisfy the requirements of the present invention are unable to achieve the objects thereof.

In addition, Examples 14 and 15 are superior to Examples 13, 16 and 17 in the glossiness and the scratch resistance, which proves the ink is preferably heated at from 40 to 80° C.

Having now fully described the invention, it will be apparent to one of ordinary skill in the art that many changes and modifications can he made thereto without departing from the spirit and scope of the invention as set forth therein.

What claimed is:

1. An aqueous ink for inkjet, comprising:
   water;
   a hydrosoluble organic solvent;
   a pigment; and
   a particulate resin,
   wherein the hydrosoluble organic solvent comprises 2,3-butanediol and 1,2-propanediol at a weight ratio (2,3-butanediol/1,2-propanediol) of from 98/2 to 60/40, and
   wherein the hydrosoluble organic solvent further comprises 1,3-butanediol.

2. The aqueous ink for inkjet of claim 1, wherein the ink comprises the 2,3-butanediol in an amount of from 5 to 40% by weight.

3. The aqueous ink for inkjet of claim 1, wherein the hydrosoluble organic solvent further comprises a member selected from the group consisting of 1,3-propanediol and 1,2-butanediol.

4. The aqueous ink for inkjet of claim 1, wherein the ink comprises the particulate resin more than the pigment.

5. The aqueous ink for inkjet of claim 1, wherein the particulate resin has a volume-average particle diameter not greater than 50 nm.

6. An inkjet recorder, comprising:
   an ink container or an ink cartridge configured to contain the aqueous ink for inkjet according to claim 1;
   an inkjet recording head or a recording unit having the inkjet recording head configured to forms the ink into a droplet with an energy to discharge; and
   a heater configured to heat the ink after printed.

7. The inkjet recorder of claim 6, wherein the ink is heated at from 40 to 80° C.

8. An inkjet recording method, comprising:
   applying a heat energy or a mechanical energy to the aqueous ink for inkjet according to claim 1 to discharge and record on a nonpermeable substrate.

* * * * *